United States Patent Office 3,252,836
Patented May 24, 1966

3,252,836
PROCESS FOR FRACTIONATING FILM-GRADE AMYLOSE FROM AMYLOMAIZE STARCH
Roy A. Anderson and Charles Vojnovich, Peoria, Ill., assignors to the United States of America as represented by the Secretary of Agriculture
No Drawing. Filed Oct. 16, 1963, Ser. No. 316,778
7 Claims. (Cl. 127—71)

A nonexclusive, irrevocable, royalty-free license in the invention herein described, throughout the world for all purposes of the United States Government, with the power to grant sublicenses for such purposes, is hereby granted to the Government of the United States of America.

This invention relates to a process for obtaining substantially pure amylose from amylomaize starches, also called high amylose starches.

More particularly, this invention relates to a rapid and commercially attractive process for fractionating high amylose starches having apparent amylose contents of about 40 percent to about 75 percent, of which apparent content only about 80 percent can be isolated by a most painstaking complexing with butanol.

Still more particularly, this invention relates to a commercially advantageous process for obtaining good yields of high intrinsic viscosity amylose containing not more than 20 percent of associated amylopectin from the said high amplose (amylomaize) corn starches.

It is known that fibers and strong self-supporting edible films that have special merit as coatings for foodstuffs because of their oil resistance and their outstandingly superior gas and moisture impermeability can be prepared from undegraded amylose that is at least 80 percent pure. Despite the aforesaid distinct advantages of amylose films over the now almost exclusively employed inedible hydrocarbon films, the prior art processes for recovering sufficiently pure amylose are too costly especially with respect to time and also with regard to materials to provide amylose at a competitive price. The extremely prolonged precipitation periods of the prior art methods make it impossible to operate in an efficient continuous manner.

Some of the costly prior art processes of fractionating amylose from starches were discovered prior to the development of hybrid high amylose corn, while other processes are inoperative therewith and are, therefore, limited to ordinary corn starch, which contains only 25–30 percent of amylose, or to tuber starches, it being well known that the amylomaize starches differ markedly from ordinary corn starch not only in regard to their amylose contents but also as to water dispersibility and also in the well known inability even with butanol to obtain therefrom more than 80 percent of the apparent amylose present, the inseparable 20 percent presumably being bonded to uniquely branched side chains of the amylopectin.

Schoch, Cereal Chem. 18, 121 (1941) introduced the well known butanol-complex fractionation of amylose from very dilute aqueous dispersions of ordinary corn starch. However, the process is costly since it requires about 8 to 10 times the starch weight of butanol as well as many hours for the extremely slow crystallization of the complex. Thus the process is limited to analytical employments. Schoch et al., JACS 66, 1232 (1944) also substituted oleic acid for the butanol, but the required very prolonged crystallization periods remain a commercial handicap.

A commercial process for selective precipitation of amylose from tuber starches, e.g., potato starch, employs salts such as magnesium sulfate to precipitate amylose from cooled solutions. This process is essentially inoperative for the purposes of the instant invention when applied to cooked solutions of amylomaize starch, e.g., a high amylose corn starch having an apparent amylose content of 60 percent gave a precipitate assaying only 68 percent amylose.

Etheridge et al., U.S. Patent No. 3,067,067 disclose a nonchemical method of fractionating the amylose and amylopectin of ordinary corn starch by centrifuging an amylose-rich fraction from an 8-hour or longer stand of a previously boiled and partially cooled starch solution. The crystallization requires at least 8 hours and up to 40 hours, and the process is inoperative when applied to high amylose corn starch.

The only prior art fractionation process particularly directed to high amylose corn starch (amylomaize) is that of Montgomery et al., U.S. Patent No. 3,046,161 wherein aqueous solutions or dispersions of high amylose starch are subjected to successive deep freezing and thawing cycles to disrupt the amylose-amylopectin relationships within the granules prior to extraction with hot water. It is apparent that this process cannot readily be adapted to a low cost, continuous process.

The principal object of our invention is a very rapid, continuous, and inexpensive process for fractionating the amylose present in amylomaize (high amylose) starches containing on the order of about 40 to 75 percent of apparent amylose.

Another object is a low cost method for obtaining from amylomaize having an apparent amylose content of about 40 to 75 percent an essentially undegraded amylose fraction comprising not more than 20 percent and preferably not more than 15 percent of associated amylopectin and having an overall intrinsic viscosity value in KOH of at least about 1.0.

Still another object is a process for fractionating film-grade amylose from amylomaize starch that for the first time can be conducted as a continuous process because of the brevity of the treatment steps, e.g., 5–15 minutes of cooking at unusually elevated temperatures to completely dissolve the amylomaize starch, complexing the hot amylose during only about 15 minutes with from 10–20 percent based on the dry weight of the amylomaize starch of a $C_8$–$C_{10}$ straight chain fatty alcohol or corresponding fatty acid, and quickly cooling to precipitate the complexed amylose fraction in a matter of a relatively few minutes instead of hours.

The above and related objects and advantages of our invention will be more fully presented in the course of the following specification and claims.

In accordance with the objects of our invention we have now discovered a continuous process for treating amylomaize starch containing on the order of 40–75 percent apparent amylose to fractionate therefrom in the form of a readily dissociable complex, a film-grade amylose having associated therewith exclusive of the removable complexing agent not more than 20 percent and preferably not more than 15 percent of amylopectin.

Our continuous process comprises the following operations. Amylomaize starch is slurried in sufficient water to make a 5–20 percent suspension. The slurry is then passed to a continuous cooker, e.g., a horizontal tube cooker supplying steam at 40–100 p.s.i.g. wherein the amylomaize starch slurry is heated to at least 275° F. and not above 325° C. for 5–15 minutes to completely solubilize the said starch. The final concentration of cooked material is maintained in the range of 4 to 8 percent solids by weight. The cooked solution is discharged (flashed) to the atmosphere and allowed to cool to a temperature of 180–200° F. before intimately admixing 5–10 percent based on the dry weight of the amylomaize starch of a complexing agent selected from the $C_8$–$C_{10}$ straight chain fatty acids or corresponding primary alcohols and holding at such temperature for 10–15 minutes to form a maximum of the complex, which then rapidly forms centrifugeable crystals upon further cooling the solution to 150–120° F. The precipitated amylose complex is preferably washed by resuspending in water at 140–200° F. containing a small amount of the same complexing agent to prevent any resolution, cooled as previously, recentrifuged, dried in any convenient manner for storage or packaging, and if desired defatted with 85 percent methanol to remove detrimental traces of lipid and any residual complexing agent.

The following specific examples more fully describe the operation of our invention.

Example 1

Amylomaize starch having an apparent amylose content of 60 percent was slurried in tap water and adjusted to a pH 6.7. The starch was completely solubilized by directly heating the slurry for 10 minutes at 300° F. in a commercial type horizontal-tube continuous cooker equipped with steam jets. The solution, after flashing to the atmosphere and cooling to 190° F., had a solids content of 4.86 g. per 100 ml. To 1,000 ml. of this material, octanoic acid, 0.486 g. per 100 ml. of starch solution, was admixed and the temperature of the mixture held at 185–190° F. for 15 minutes to facilitate formation of an amylose complex. Then the temperature was quickly reduced to 150° F. and the resulting crystals of the complex were obtained by centrifuging. The precipitate was washed by dispersing it for 10 minutes in water at 175–190° F. containing a small amount of octanoic acid. After cooling to 150° F., re-centrifuging, and drying on heated rolls, 20.9 g. of amylose (43 percent by weight of the original starch) was obtained. The product, after defatting with 85 percent methanol, had a purity of 86 percent and an intrinsic viscosity value in KOH at 25° C. of 1.2.

Example 2

Amylomaize starch having an apparent amylose content of 60 percent was treated in the manner of Example 1 excepting that the cooked starch solution contained 4.90 gm. solids/100 ml. One liter of this material was treated with decanoic acid instead of octanoic acid. There were obtained 20.6 g. of amylose having a purity of 85 percent and an intrinsic viscosity of 1.1.

Example 3

The procedure of Example 1 was repeated excepting that the solids content of the cooked amylomaize starch solution was 5.0 g. per 100 ml., the pH of 6.5 was not adjusted, 1-decanol (10 percent based on the weight of starch) was substituted for the octanoic acid, and the temperature of the complexed solution was allowed to fall to 130° F. There were obtained 25 g. of amylose having a purity of 87 percent and an intrinsic viscosity value of 1.0.

Example 4

Example 1 was repeated excepting that the cooked starch solution which had a solids content of 4.95 percent and a pH of 6.3 was cooled to 180° F., 1-octanol (10 percent based on the starch) was added in place of the octanoic acid, the octanol-amylose complex was formed at the said temperature, and the re-suspended amylose fraction was cooled to 120° F. before centrifuging. There were obtained 20.3 g. (41 percent by weight of the original starch) of amylose having a purity of 87 percent and an intrinsic viscosity of 1.0.

Example 5

Amylomaize starch having an apparent amylose content of 71 percent was slurried in water at pH 6.7 and completely solubilized by directly heating for 10 minutes at 275° F. in the horizontal-tube continuous cooker. The solution, after flashing to atmosphere and cooling to 180° F., had a solids content of 4.79 gm./100 ml. 1-octanol (10 percent based on the starch) was added to 1 l. of cooked slurry, and the mixture was held for 15 minutes at 180° F. The temperature was then quickly lowered to 120° F., and the amylose complex was isolated by centrifugation. The precipitate was washed by dispersing it for 15 minutes in water at 140° F., cooled and re-centrifuged. The cake was dried on heated rolls. There were obtained 37.6 gm. (78.5 percent of the starch) of amylose having a purity of 84 percent and an intrinsic viscosity of 1.05.

We claim:

1. A continuous process for obtaining film-grade amylose having a purity of at least 80 percent and an intrinsic viscosity in 1 N potassium hydroxide at 25° C. of at least 1.0 comprising heating a slurry of amylomaize starch having an apparent amylose content of about 40 to 75 percent with direct steam to 275–325° F. for 5–15 minutes, the slurry being of a concentration such that the concentration of starch in the resulting solution is from 4 to 8 percent by weight, flashing the solution to the atmosphere, cooling the solution to 180–200° F., admixing 5–10 percent based on the original weight of starch of a complexing agent selected from the group consisting of the $C_8$–$C_{10}$ straight chain aliphatic acids and the corresponding $C_8$–$C_{10}$ normal primary alcohols, holding the mixed solution at 180°–200° F. for 10–15 minutes to complex the amylose, cooling the solution to 150°–120° F. to crystallize the complex, centrifuging to isolate the crystallized complex, washing the isolated complex in hot water containing enough of the complexing agent to prevent redissolving, recovering the washed material, drying, and washing in 85 percent methanol to defat and to remove residual complexing agent.

2. The process of claim 1 wherein the complexing agent is octanoic acid.

3. The process of claim 1 wherein the complexing agent is decanoic acid.

4. The purocess of claim 1 wherein the complexing agent is 1-decanol.

5. The process of claim 1 wherein the complexing agent is 1-octanol.

6. The process of claim 1 wherein amylomaize starch has apparent amylose content of about 60 percent.

7. The process of claim 1 wherein amylomaize starch has apparent amylose content of about 70 percent.

References Cited by the Examiner

UNITED STATES PATENTS

| | | | |
|---|---|---|---|
| 2,779,693 | 1/1957 | Pascu et al. | 127—71 |
| 3,046,161 | 7/1962 | Montgomery et al. | 127—71 |
| 3,067,067 | 12/1962 | Etheridge et al. | 127—71 |
| 3,103,451 | 9/1963 | McDonald et al. | 127—32 |

MORRIS O. WOLK, *Primary Examiner.*

E. G. WHITBY, *Assistant Examiner.*